(12) United States Patent
Toll

(10) Patent No.: US 9,718,509 B2
(45) Date of Patent: Aug. 1, 2017

(54) BICYCLE SEAT

(71) Applicant: TAMPA BAY RECREATION, LLC, Lutz, FL (US)

(72) Inventor: Steven G. Toll, Lutz, FL (US)

(73) Assignee: Tampa Bay Recreation, LLC, Lutz, FL (US)

( * ) Notice: Subject to any disclaimer, the term of this patent is extended or adjusted under 35 U.S.C. 154(b) by 0 days.

(21) Appl. No.: 14/422,223

(22) PCT Filed: Aug. 27, 2013

(86) PCT No.: PCT/US2013/056805
§ 371 (c)(1),
(2) Date: Feb. 18, 2015

(87) PCT Pub. No.: WO2014/035972
PCT Pub. Date: Mar. 6, 2014

(65) Prior Publication Data
US 2015/0239515 A1 Aug. 27, 2015

Related U.S. Application Data

(60) Provisional application No. 61/693,909, filed on Aug. 28, 2012.

(51) Int. Cl.
*B62J 1/18* (2006.01)
*B62J 1/00* (2006.01)
(52) U.S. Cl.
CPC .............. *B62J 1/007* (2013.01); *B62J 1/002* (2013.01); *B62J 1/18* (2013.01)

(58) Field of Classification Search
CPC .............. B62J 1/00; B62J 1/002; B62J 1/007
See application file for complete search history.

(56) References Cited

U.S. PATENT DOCUMENTS

| | | | | |
|---|---|---|---|---|
| 532,444 | A | * | 1/1895 | Christy .................... B62J 1/002 297/202 |
| 537,375 | A | * | 4/1895 | Wright et al. ........... B62J 1/005 297/201 |

(Continued)

FOREIGN PATENT DOCUMENTS

| WO | WO2006/015731 | 2/2006 |
|---|---|---|
| WO | WO2011/019650 | 2/2011 |

OTHER PUBLICATIONS

Jul. 15, 2014, Supplementary European Search Report EP 13833733.

(Continued)

*Primary Examiner* — Philip Gabler
(74) *Attorney, Agent, or Firm* — Neifeld IP Law, P.C.

(57) ABSTRACT

A split-nose bicycle seat, comprising: a rigid plastic base provided with attachment points for mounting the seat to the bicycle frame, a total length of the seat of about 260-280 mm, a split nose section formed by two elongated protrusions of substantially constant width extending forward from a medial section to a front surface, said elongated protrusions angle inwardly, a cushioned pubis bone support surface with a substantially flat side profile, and a drooped nose, said split nose section transitioning aft to a medial section having a width of about 110 mm at the widest point of the seat, said medial section transitioning aft to a rear-end section.

3 Claims, 6 Drawing Sheets

(56) References Cited

U.S. PATENT DOCUMENTS

| | | | | |
|---|---|---|---|---|
| 612,972 | A * | 10/1898 | Leech | B62J 1/002 |
| | | | | 297/201 |
| 1,858,477 | A * | 5/1932 | Blake | B62J 1/02 |
| | | | | 297/202 |
| 6,113,184 | A * | 9/2000 | Barnes | B62J 1/007 |
| | | | | 297/197 |
| 6,193,309 | B1 * | 2/2001 | Gootter | B62J 1/002 |
| | | | | 297/202 |
| 6,402,236 | B1 | 6/2002 | Yates | |
| 7,934,770 | B2 * | 5/2011 | Toll | B62J 1/007 |
| | | | | 297/202 |
| 8,845,018 | B2 * | 9/2014 | Toll | B62J 1/007 |
| | | | | 297/195.1 |
| 2002/0117880 | A1 * | 8/2002 | Ladson, III | B62J 1/007 |
| | | | | 297/201 |
| 2015/0097401 | A1 * | 4/2015 | Toll | B62J 1/007 |
| | | | | 297/214 |

OTHER PUBLICATIONS

Machine English translation of Abstract, RU 2377154.
Search Report PCT/US13/56805.
Written Opinion PCT/US13/56805.
IPRP PCT/US13/56805.

* cited by examiner

ATTACK
1 Minute Readings

| | O2 | % Blood Flow | CO2 | Power mW | |
|---|---|---|---|---|---|
| 10:37:55 | 39 | 100 | 34 | 308 | BASE LINE |
| 10:38:00 | 38 | 97.43 | 35 | 323 | |
| 10:39:00 | 44 | 112.82 | 35 | 446 | |
| 10:40:00 | 43 | 110.25 | 33 | 447 | |
| 10:41:00 | 42 | 107.69 | 34 | 445 | |
| 10:42:00 | 44 | 112.82 | 33 | 443 | |
| 10:43:00 | 48 | 123.07 | 33 | 436 | |
| 10:44:00 | 45 | 115.38 | 33 | 433 | |
| 10:45:00 | 42 | 107.6 | 34 | 432 | |
| 10:46:00 | 43 | 110.25 | 34 | 416 | |
| 10:47:00 | 40 | 102.56 | 34 | 424 | |
| 10:48:00 | 40 | 102.56 | 34 | 405 | |
| 10:49:00 | 42 | 107.6 | 31 | 395 | |
| 10:50:00 | 55 | 141.02 | 30 | 384 | |
| 10:51:00 | 57 | 146.15 | 27 | 362 | |
| 10:52:00 | 55 | 141.02 | 27 | 359 | DROPS |
| 10:53:00 | 44 | 112.82 | 27 | 392 | |
| 10:54:00 | 39 | 100 | 28 | 395 | |
| 10:55:00 | 43 | 110.25 | 27 | 397 | |
| 10:56:00 | 37 | 94.87 | 27 | 386 | |
| 10:57:00 | 36 | 92.3 | 26 | 380 | |
| 10:58:00 | 37 | 94.87 | 26 | 370 | |
| 10:59:00 | 51 | 130.76 | 26 | 366 | |
| 11:00:00 | 59 | 151.28 | 25 | 355 | |

BICYCLE SEAT

CROSS-REFERENCE TO RELATED APPLICATIONS

This application is a national stage entry of PCT/US2013/056805, filed Aug. 27, 2013, which published as WO 2014/035972 on Mar. 6, 2014, which claims the benefit of U.S. Application No. 61/693,909, filed Aug. 28, 2012.

BACKGROUND

1. Technical Field

This invention relates to a bicycle seat which comfortably supports a bicycle rider.

2. Description of the Related Art

A bicycle seat must support the rider comfortably for rides of long duration and aid the rider in controlling and stabilizing the bicycle. It is well known to bicycle riders that the conventional saddle can cause chafing, blistering, bruising, and possibly injury to the rider. A primary cause of discomfort is the pressure exerted on sensitive areas of the body (i.e. the sacral, coccal, ischial, and perineal/genital regions) when the weight of the rider rests on a traditional bicycle seat.

Recent studies have linked perineal pressure caused by traditional bicycle seats to urinary tract and yeast infections. Sitting on traditional bicycle seats can compress tender genital tissues against the seat causing irritation to the genitals.

In both male and female riders the crotch area contains nerves and pudendal arteries leading to the genitals. In the male, the pudendal artery carries blood flow that enables erection. Sitting on a traditional bicycle seat can increase the pressure in the pudendal arteries causing a decrease in blood flow for both men and women. This decrease in blood flow may cause numbness potentially leading to impotency in certain male bicycle riders. (Numbness is caused by compression of the pudendal nerve. However, compression of the artery is not something a rider feels.

In order to overcome these problems, the prior art provides seats with a groove at the nose portion of the bicycle seat, which results in a right side nose portion separated by a gap from the left side nose portion (split nose). The opening is intended to reduce the pressure but does not always work, and sometimes creates even more pressure exerted on the genital area by the rider's weight on the seat.

An improved split-nose bicycle seat contoured to fully support the coccyx, sacrum, and ischium bones, while providing a relieved area for the perineum/genital regions, was disclosed by the present inventor in U.S. patent application Ser. No. 12/685,311, filed Jan. 11, 2010, incorporated herein by reference. This prior design provides support for the tissues and musculature surrounding the aforementioned pelvic areas.

However, there is still need for a seat which helps the rider to assume several differing positions on the seat while avoiding undesirable pressure on the rider's perineum. Primarily female riders, but some male riders too, have reported small areas of tenderness, contusions and abrasions to the perineal space of their bodies.

SUMMARY OF THE INVENTION

An object of the present invention is to provide a split-nose bicycle seat, comprising:

a rigid plastic base provided with attachment points for mounting the seat to the bicycle frame, a total length of the seat of about 260-280 mm, a split nose section formed by two elongated protrusions of substantially constant width extending forward from a medial section to a front surface, said elongated protrusions angle inwardly, a cushioned pubis bone support surface with a substantially flat side profile, and a drooped nose, said split nose section transitioning aft to a medial section having a width of about 110-115 mm at the widest point of the seat, said medial section transitioning aft to a rear-end section.

BRIEF DESCRIPTION OF THE DRAWINGS

FIG. 7 is a spread sheet showing results of blood flow testing at 1 minute readings.

DETAILED DESCRIPTION OF THE INVENTION

Figure 1:
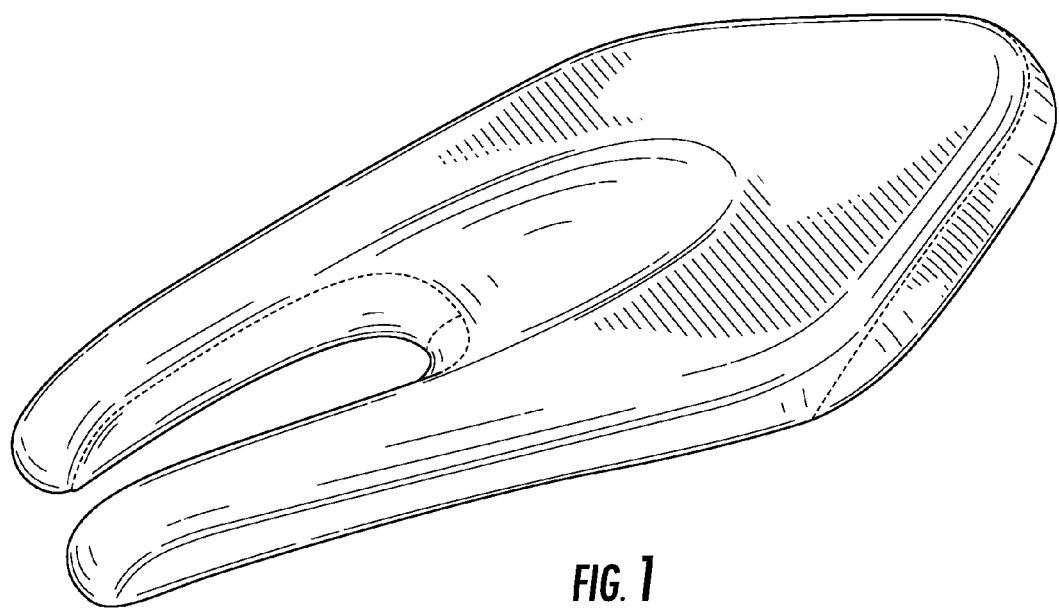
FIG. 1 is a perspective top view of a bicycle seat of the present invention.
Figure 2:
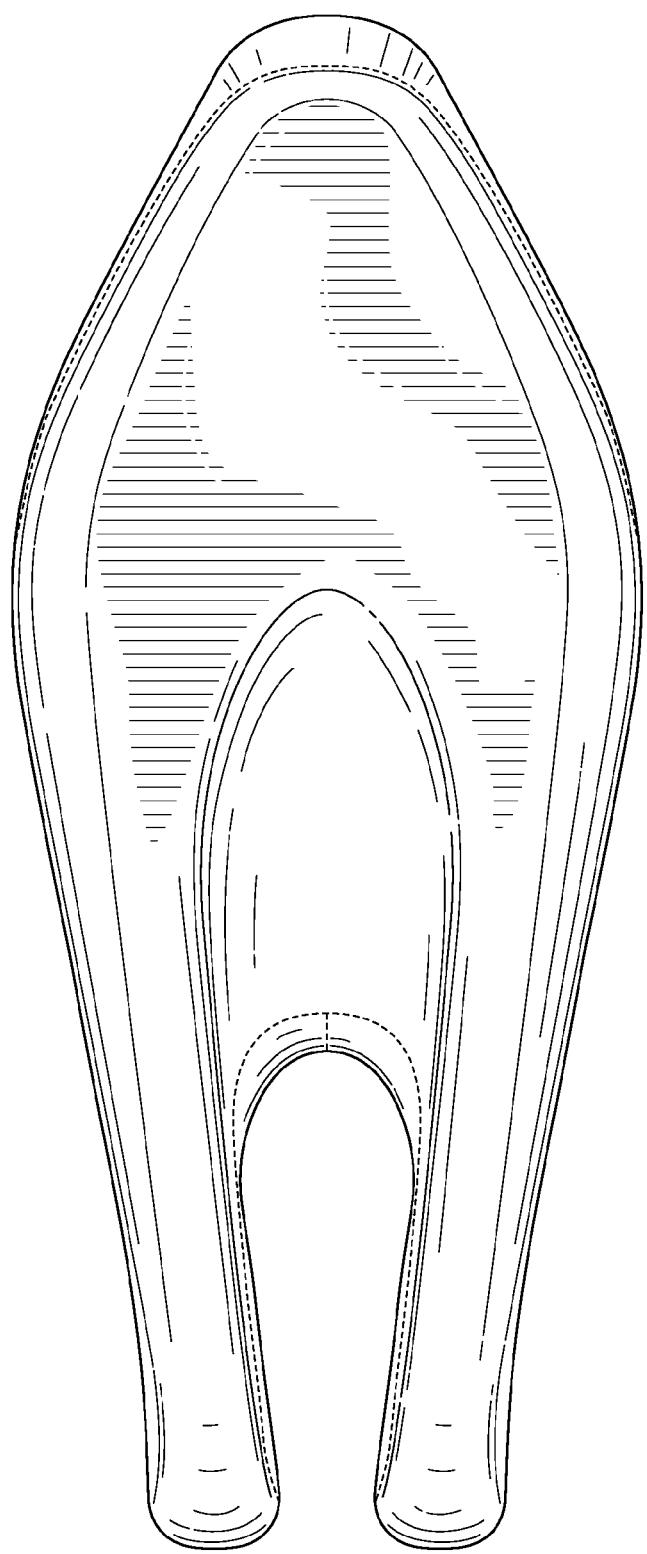
FIG. 2 is a top view of a bicycle seat of the present invention.
Figure 3:
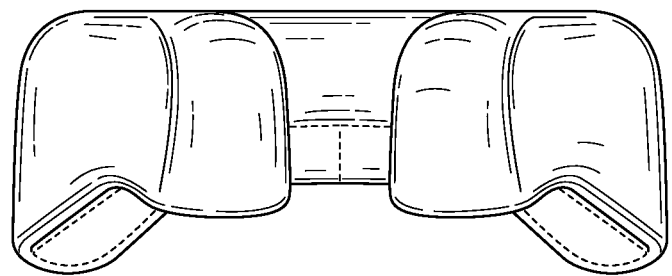
FIG. 3 is a perspective top rear view of a bicycle seat of the present invention
Figure 4:
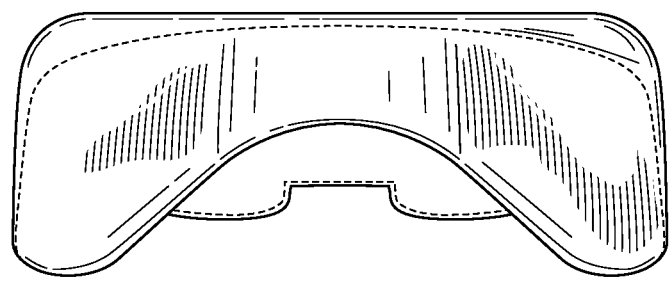
FIG. 4 is a side view of a bicycle seat of the present invention.
Figure 5:
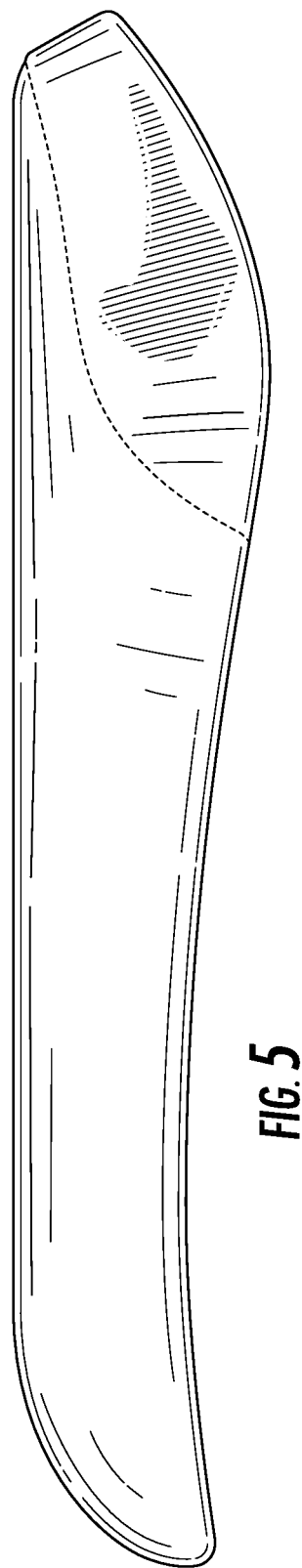
FIG. 5 is a side view of a bicycle seat of the present invention.
Figure 6:
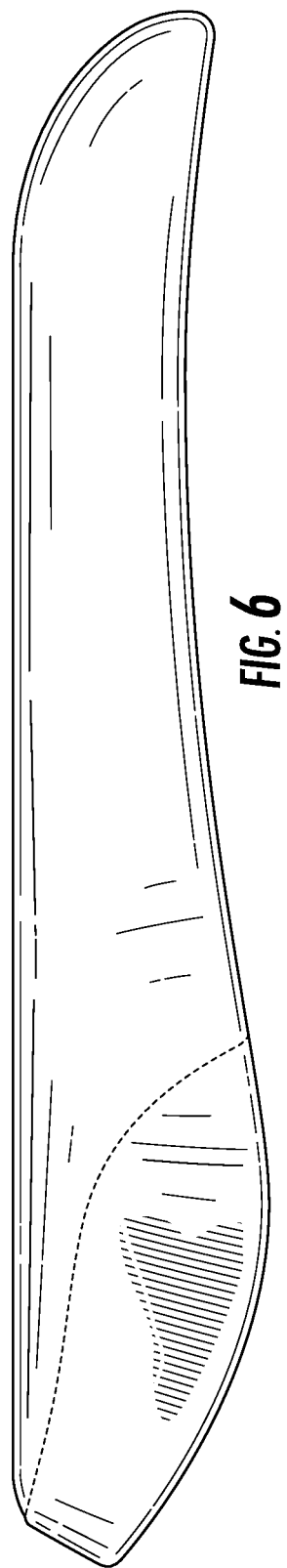
FIG. 6 is a side view of a bicycle seat of the present invention.
Figure 8:
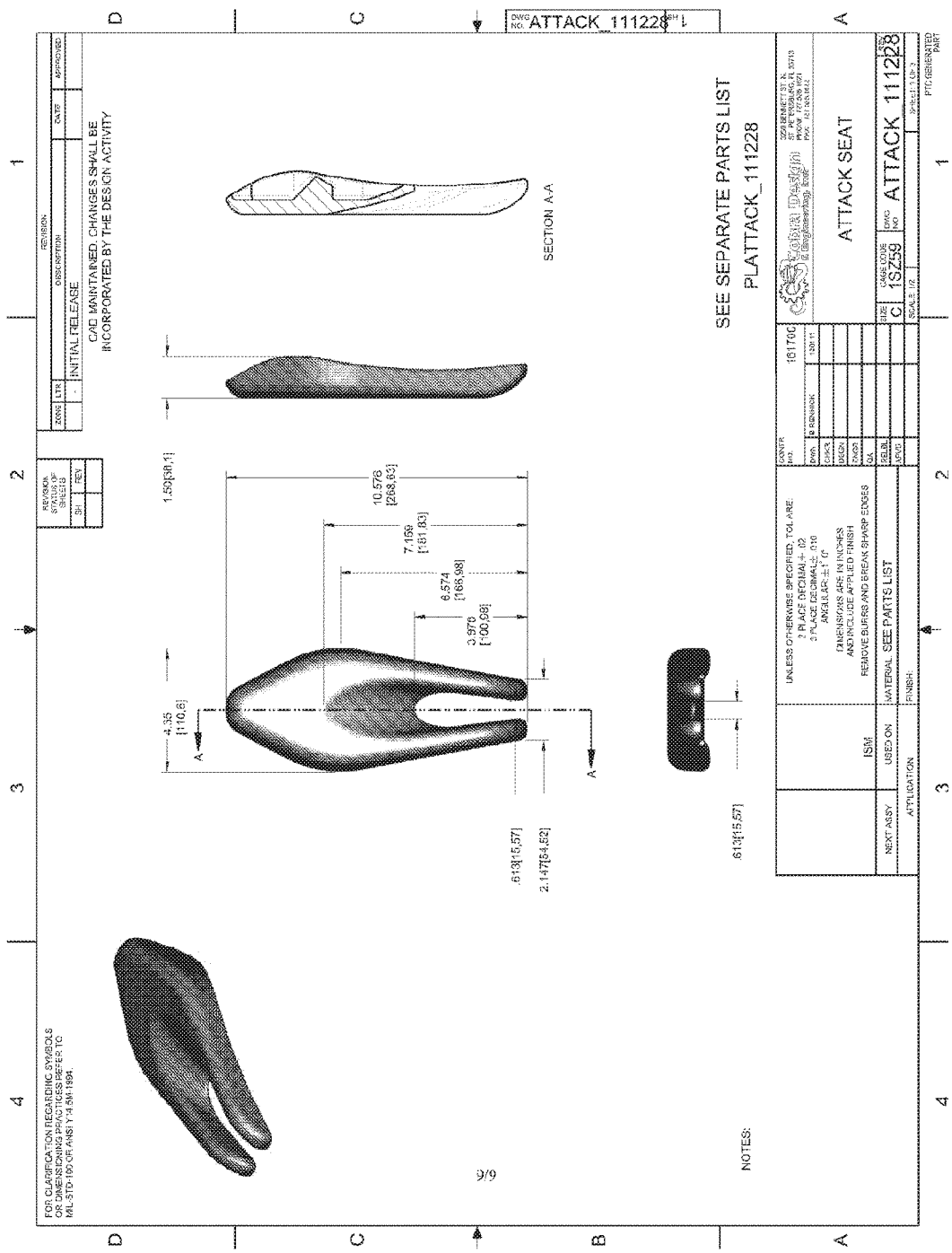
FIG. 8 shows dimensions of a preferred embodiment of the invention.

The bicycle seat of the present invention provides anatomic features which fully support the sacrum, coccyx, and complete ischium of the rider. It includes a rigid shell/frame, a cushioned area, and an outerwear surface.

The frame is a one-piece plastic frame preferably made of an injection molded polypropylene, polyurethane, polymer, ABS copolymer, nylon or other like material The shell/frame includes an attachment device for mounting the seat to the bicycle's frame. The attachment device and the outerwear surface are conventional and well-known to those skilled in the art and will not be discussed in detail.

The seat includes a bifurcated front-end section (split nose), a medial section, and a rear-end section (tail). The seat widens from the nose to the back of the medial section and narrows thereafter to rear end, defining an overall length L and a width W.

The total length of the seat is 260-280 mm, preferably 268 mm. The total width is about 100-110 mm, preferably 110 mm.

Front-End Section (Split Nose)

The front end of the seat according to the present invention is a split nose formed by two elongated protrusions of substantially constant width extending forward from a medial section to the front surface.

This saddle is narrower at its widest point than prior art split nose designs, and the trough in the middle extends to a position about ⅔rds the length of the entire saddle. The goal was to reduce or eliminate compression of the pudendal nerve and artery when the riders wanted to ride in a less aggressive riding position, sometimes called riding slack.

The present invention was designed for the more aggressive cyclist looking to achieve positive blood flow results while riding in different riding positions. Two distinct design changes were incorporated into this saddle improve rider comfort and reduce or eliminate pudendal nerve and artery compression.

The relief area provided by the front arms was widened on the inside of the front arms and carried back into the mid-section of the saddle. The length of the relief area is approximately ⅔rds (180 mm) the total length of the saddle. As the middle relief area transcends into the mid-section of the saddle the width of this area widens with a depth of approximately 8 mm (at the top end of the front arms) decreasing/sloping upward to the top surface of the saddle at the ⅔rds position of the length of the saddle. The opening is arrowhead shaped and is approximately 44 mm in width at the widest point. The extra opening allows for less or no compression to the soft tissue area of the rider on more of the surface area of the saddle.

The saddle is about 110 mm wide at its widest point. The reduction in width relative to prior designs is to allow for less obstruction to the hamstring muscles while the rider is pedaling. Less width means less contact area.

The present saddle has been tested for blood flow and gave excellent results (FIG. 7). Blood flow averaged better than 100% during the test. The more narrow width is attractive to professional riders because it allows for reduced saddle interference of the hamstrings.

The nose includes a longitudinally extending gap between these elongated protrusions of about 180 mm at the top surface and about 100 mm at the base of the seat, which creates a narrow space where the rider's perineal/genital area is positioned without experiencing undue pressure or pain from the bicycle seat. The longitudinal gap is sized and contoured to provide pressure relief due to reduced contact of the private parts (perineum and/or genitalia, depending on forward or rearward riding position, respectively) of both male and female riders.

The depth of the longitudinal gap is about 90-100 mm but the exact dimensions corresponding to the depth, width, and height of the longitudinal gap may vary depending on the performance and comfort requirements of different riders and bicycles. These dimensions can be varied to accommodate different sized pelvic structures and intended uses.

The split nose section extends relatively far forward but drops away or droops. Having a drooped nose reduces or eliminates pressure on the superficial perineum area which may be produced by other bicycles seats.

Each half of the split nose is strategically positioned and padded to provide a cushioned pubis bone support surface having a substantially flat side profile. The split nose also provides support for the upper back portion of the rider's thighs, thereby reducing the weight to be supported by the buttocks.

A cutout separates the right side nose from the left side nose at the front-end section of the seat. The longitudinally extending gap between said elongated protrusions is about 15 mm near the front and widens aft to about 30 mm/

The present invention contemplates having the central groove in the form of a different shape such as a rectangle, ellipse, pear, or hyperbola.

The central gap and the cutout cooperate with each other to define an open space for relieving pressure on the pudendal arteries and nerves of a seat occupant; thus, the seat provides increased comfort during extended periods of use, due to a redistribution of the rider's weight.

Medial Section

The medial section includes an area that supports a rider's buttocks and tailbone, The sides of the medial section curve gently toward the area where the front arms begin to form and serves to distribute the rider's weight without irritating the ham string muscle.

Rear End Section (Tail)

The top surface of the rear end section is substantially flat.

The tail is relatively narrow compared to traditional seats.

The present invention may include cushioning gel layer against any appreciable lateral movement relative to the shell, and be of a thickness and in a location which permits only limited up and down deflection. A thin gel layer may be located below the rider's ischial pelvic or sitting bones and genital areas.

However, if the gel layer extends downwardly onto the sloping side portions of the seat, it may cause excessive movement for the rider along with rubbing and chafing of the skin. The gel layer should have sufficient thickness to provide adequate deformation to relieve excessive pressure on the pelvic bones so as to provide a comfortable ride.

A layer of relatively firm plastic foam may advantageously be provided between the seat lower shell and the flexible cover to provide additional resilient support for the rider and for constraining the gel layer.

The seat of the present invention comprises combined features that provide full anatomical support and accommodation for areas of the pelvis including the surrounding tissues and musculature. It is exceptionally comfortable to use even for long periods of riding. It is light in weight, small, attractive in appearance, and streamlined. The seat weight is approximately 275-350 grams and its height is about 45 mm.

The seat of this invention includes a combination of features, including an extended drooped nose, narrow medial section, cutout, and central gap, to provide greater and more even weight support to the rider. Thus, pressure upon the perineum/genital region is diminished while the pudendal artery and the pudendal nerve are free of compression. As a result the seat is exceptionally comfortable for long periods of riding.

The embodiments of the invention described above are to be considered illustrative and not restrictive; the scope of the invention being indicated by the appended claims. All changes which come within the meaning and range of equivalency of the claims are intended to be embraced therein.

The invention claimed is:

1. A split-nose bicycle seat, comprising:
   a rigid plastic base provided with attachment points for mounting the seat to the bicycle frame,
   a total length of the seat of about 260-280 mm,
   split nose section formed by two elongated protrusions of substantially constant width extending forward from a medial section to a front surface,
   said elongated protrusions angle inwardly, a cushioned pubis bone support surface with a substantially flat side profile, and a drooped nose,
   wherein a longitudinally extending gap between said elongated protrusions is about 15 mm near the front and widens aft to about 30 mm, and said longitudinally extending gap between said elongated protrusions is about 180 mm at the top surface,
   said split nose section transitioning aft to a medial section having a width of about 110 mm at the widest point of the seat and a substantially flat upper surface,
   said medial section transitioning of to a rear-end section having a substantially flat upper surface.

2. The seat of claim 1, wherein the plastic base is covered by a foam cushion layer and said pubis bone support area has a gel cushion layer above the foam cushion layer.

3. The seat of claim 1, wherein the total length is about 268 mm.

\* \* \* \* \*

UNITED STATES PATENT AND TRADEMARK OFFICE
CERTIFICATE OF CORRECTION

PATENT NO. : 9,718,509 B2
APPLICATION NO. : 14/422223
DATED : August 1, 2017
INVENTOR(S) : Toll It is certified that error appears in the above-identified patent and that said Letters Patent is hereby corrected as shown below:

Column 4 Lines 66-67 change:
"said medial section transitioning of to a rear-end section having a substantially flat upper surface."
To:
-- said medial section transitioning aft to a rear-end section having a substantially flat upper surface. --

Signed and Sealed this
First Day of May, 2018

Andrei Iancu
*Director of the United States Patent and Trademark Office*